United States Patent
Thuringer et al.

(10) Patent No.: US 12,476,484 B2
(45) Date of Patent: Nov. 18, 2025

(54) ENERGY HARVESTING UNIT AND OPERATING METHOD THEREOF

(71) Applicant: NXP B.V., Eindhoven (NL)

(72) Inventors: Peter Thuringer, Graz (AT); Ulrich Andreas Muehlmann, Graz (AT); Daniel Lopez-Diaz, Graz (AT); Franz Amtmann, Graz (AT); Yoganathan Sivakumar, Graz (AT)

(73) Assignee: NXP B.V., Eindhoven (NL)

( * ) Notice: Subject to any disclaimer, the term of this patent is extended or adjusted under 35 U.S.C. 154(b) by 66 days.

(21) Appl. No.: 18/503,226

(22) Filed: Nov. 7, 2023

(65) Prior Publication Data
US 2024/0154458 A1    May 9, 2024

(30) Foreign Application Priority Data
Nov. 7, 2022   (EP) .................................... 22205931

(51) Int. Cl.
*H02M 5/06*   (2006.01)
*H02J 50/00*  (2016.01)
*H02J 50/20*  (2016.01)
*H02J 50/40*  (2016.01)

(52) U.S. Cl.
CPC ............ *H02J 50/001* (2020.01); *H02J 50/20* (2016.02); *H02J 50/402* (2020.01)

(58) Field of Classification Search
CPC ......... H02J 50/001; H02J 50/20; H02J 50/402
See application file for complete search history.

(56) References Cited

U.S. PATENT DOCUMENTS

| | | | |
|---|---|---|---|
| 9,935,370 B2 | 4/2018 | Casse et al. | |
| 10,700,557 B2 | 6/2020 | Barukh | |
| 11,038,262 B2* | 6/2021 | Yehezkely | H04W 4/80 |
| 2007/0153561 A1* | 7/2007 | Mickle | H02J 50/27 |
| | | | 340/10.34 |
| 2016/0301257 A1 | 10/2016 | Parks et al. | |

(Continued)

FOREIGN PATENT DOCUMENTS

WO   WO-2011/084891 A1   7/2011

OTHER PUBLICATIONS

Cho et al.: "RectBoost: Start-up Boosting for Rectenna Using an Adaptive Matching Network," 2021 IEEE International Symposium on Circuits and Systems (ISCAS), IEEE, DOI: 10.1109/ISCAS51556. 2021.9401601, Downloaded on May 11, 2022 at 11:58:55 UTC from IEEE Xplore, pp. 1-5.

(Continued)

*Primary Examiner* — Rexford N Barnie
*Assistant Examiner* — Esayas G Yeshaw

(57) ABSTRACT

An energy harvesting unit includes a plurality of antennas configured to receive one or more signals and a plurality of first charge pumps, in which each of the first charge pumps is operatively coupled to one of the antennas, thereby forming pairs of antennas and first charge pumps. The energy harvesting unit also includes a selection unit configured to measure and compare output voltages of the first charge pumps and to select, from the antennas, a specific antenna. The specific antenna is coupled to the first charge pump that produces the highest output voltage. The energy harvesting unit also includes a multiplexer configured to couple the specific antenna selected by the selection unit to a second charge pump.

20 Claims, 3 Drawing Sheets

(56) References Cited

U.S. PATENT DOCUMENTS

2020/0227813 A1\* 7/2020 Yehezkely .............. H04W 4/70
2021/0342559 A1\* 11/2021 Frederick ............... H04B 5/263
2022/0131424 A1 4/2022 Charthad et al.

OTHER PUBLICATIONS

NXP Semiconductors: "SL3S1205_15—UCODE 8/8m," Rev. 3.2—Nov. 19, 2018, 398432, Product data sheet, Company Public, pp. 1-36.

Popovic, et al.: "Scalable RF Energy Harvesting," IEEE Transactions on Microwave Theory and Techniques, vol. 62, No. 4, Apr. 2014, DOI: 0.1109/TMTT.2014.2300840, pp. 1046-1056.

Ulisse, et al.: "A Multiband 150nm CMOS Energy Harvester Architecture," 2019 Photonics & Electromagnetics Research Symposium, Spring (PIERS—Spring), Rome, Italy, Jun. 17-20, 2019, Downloaded on May 11, 2022 at 11:50:18 UTC from IEEE Xplore, pp. 1165-1170.

\* cited by examiner

ENERGY HARVESTING UNIT AND OPERATING METHOD THEREOF

CROSS-REFERENCE TO RELATED APPLICATIONS

This application claims the priority under 35 U.S.C. § 119 of European Patent application no. 22205931.3, filed on 7 Nov. 2022, the contents of which are incorporated by reference herein.

TECHNICAL FIELD

The present disclosure relates to an energy harvesting unit. Furthermore, the present disclosure relates to a corresponding method of operating an energy harvesting unit.

BACKGROUND

Energy harvesting units, which are configured to harvest energy from a radio frequency (RF) field or a near field communication (NFC) field generated by an external emitter, may be used in various applications. For example, energy harvesting units may be used in so-called sensor nodes, to provide the internal components in said sensor nodes with sufficient energy to carry out their functions and operations. The harvested energy may also be used to actively transmit data from the sensor node. Generally speaking, it may be desirable to provide an efficient energy harvesting unit, which is able to harvest sufficient energy for powering all the internal components of a device in which said unit is integrated or to which it supplies power. In that case, only a small additional power source (e.g., a battery) may be needed in said device, or no additional power source may be needed at all.

SUMMARY

In accordance with a first aspect of the present disclosure, an energy harvesting unit is provided, comprising: a plurality of antennas configured to receive one or more signals; a plurality of first charge pumps, wherein each of said first charge pumps is operatively coupled to one of said antennas, thereby forming pairs of antennas and first charge pumps; a selection unit configured to measure and compare output voltages of the first charge pumps and to select, from said antennas, a specific antenna, wherein said specific antenna is coupled to the first charge pump that produces the highest output voltage; a second charge pump; a multiplexer, wherein said multiplexer is configured to couple the specific antenna selected by the selection unit to the second charge pump.

In one or more embodiments, the second charge pump is optimized for a higher output power than each of the first charge pumps.

In one or more embodiments, the energy harvesting unit further comprises a plurality of matching circuits, wherein each of said matching circuits is coupled between one of said pairs of antennas and first charge pumps.

In one or more embodiments, the energy harvesting unit further comprises a tuning circuit configured to fine-tune the matching circuit which is coupled to the specific antenna selected by the selection unit.

In one or more embodiments, the energy harvesting unit further comprises an energy storage unit coupled to an output of the second charge pump.

In one or more embodiments, the energy storage unit comprises a capacitor.

In one or more embodiments, the first charge pumps are configured to rectify the signals received by said antennas.

In one or more embodiments, said pairs of antennas and first charge pumps are tuned to different radio frequency bands.

In one or more embodiments, each of the matching circuits is tuned to a center frequency of one of said radio frequency bands.

In one or more embodiments, the antennas remain connected to the first charge pumps both during a decision phase of the energy harvesting unit and during an energy harvesting phase of the energy harvesting unit; and the second charge pump is not connected to any one of said antennas during said decision phase.

In one or more embodiments, a sensor node, in particular a sensor node included in an internet-of-things sensor network, comprises the energy harvesting unit of any preceding claim.

In accordance with a second aspect of the present disclosure, a method of operating an energy harvesting unit is conceived, the energy harvesting unit comprising a plurality of antennas, a plurality of first charge pumps, a selection unit, a second charge pump and a multiplexer, wherein each of said first charge pumps is operatively coupled to one of said antennas, thereby forming pairs of antennas and first charge pumps, the method comprising: receiving, by the antennas, one or more signals; measuring and comparing, by the selection unit, output voltages of the first charge pumps; selecting, by the selection unit, from said antennas a specific antenna, wherein said specific antenna is coupled to the first charge pump that produces the highest output voltage; coupling, by the multiplexer, the specific antenna selected by the selection unit to the second charge pump.

In one or more embodiments, the second charge pump is optimized for a higher output power than each of the first charge pumps.

In one or more embodiments, the energy harvesting unit further comprises a plurality of matching circuits, wherein each of said matching circuits is coupled between one of said pairs of antennas and first charge pumps.

In one or more embodiments, the method further comprises storing the output of the second charge pump in an energy storage unit comprised in the energy harvesting unit.

DESCRIPTION OF DRAWINGS

Embodiments will be described in more detail with reference to the appended drawings.

DESCRIPTION OF EMBODIMENTS

As mentioned above, energy harvesting units may be used in sensor nodes. More specifically, the need of continuous measurements of certain parameters using sensor networks has grown not only in industry, but also in public areas (e.g., smart buildings), traffic and private lives (e.g., smart homes). For instance, internet-of-things (IoT) sensor networks consist of devices which are currently powered by batteries. However, batteries require regular maintenance, which in turn incurs high costs and therefore limits the deployment of such systems. In addition, the use of batteries produces waste, which has a large negative environmental impact. Therefore, the use of batteries should be avoided as much as possible.

Now discussed are an energy harvesting unit and a corresponding method of operating an energy harvesting unit, which facilitate reducing the need for an additional power source (e.g., a battery) in a device, in particular by harvesting sufficient energy for powering all the internal components of said device. The presently disclosed energy harvesting unit may be used to advantage in a sensor node, in particular a sensor node included in an IoT sensor network. It is noted that the presently disclosed energy harvesting unit may also be used to advantage in various other applications. Non-limiting examples of such applications are beacons for localization purposes, beacons for advertisements, and different kinds of "intelligent" switches (e.g. in smart homes). Furthermore, the presently disclosed energy harvesting unit may be used to advantage in RFID and NFC applications, for example to increase the operating range or perform data logging. Generally speaking, the presently disclosed energy harvesting unit may be used to advantage in nearly all low-power devices which have a small battery and do not have a need for continuous operation with a duty cycle near 100%.

Figure 1:
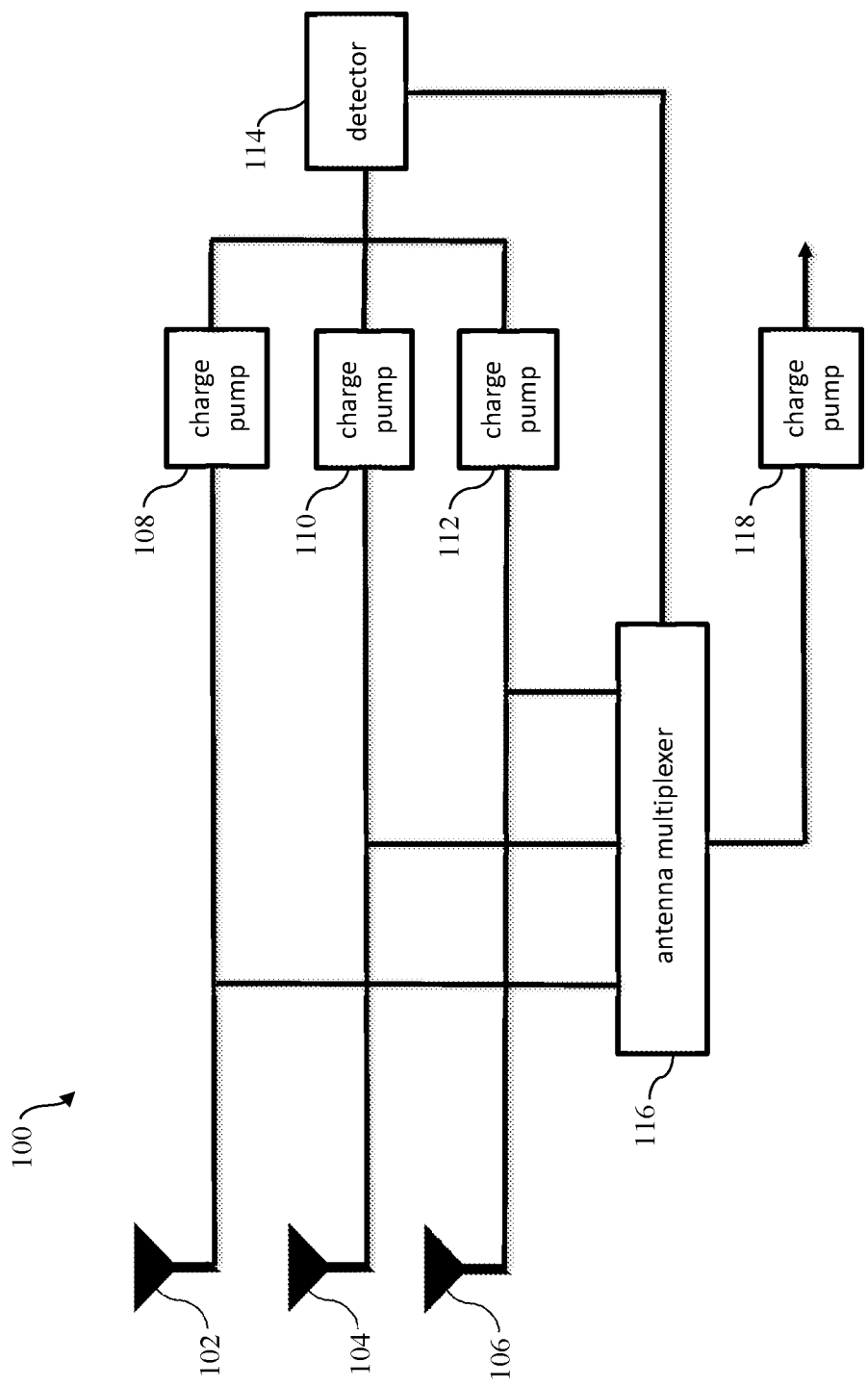
FIG. 1 shows an illustrative embodiment of an energy harvesting unit.

FIG. 1 shows an illustrative embodiment of an energy harvesting unit 100. The energy harvesting unit 100 comprises a plurality of antennas 102, 104, 106, which are configured to receive one or more signals. The signals may be radio frequency (RF) signals or near field communication (NFC) signals, for example. Furthermore, the energy harvesting unit 100 comprises a plurality of first charge pumps 108, 110, 112, each one of which is operatively coupled to one of said antennas 102, 104, 106, so that pairs of antennas and first charge pumps are formed. In addition, the energy harvesting unit 100 comprises a detector 114. The detector 114, which also may be referred to as a selection unit, is configured to measure and compare output voltages of the first charge pumps 108, 110, 112 and to select, from said antennas 102, 104, 106, a specific antenna, wherein said specific antenna is coupled to the first charge pump that produces the highest output voltage (i.e., the first charge pump that has the highest output voltage among all first charge pumps). Furthermore, the energy harvesting unit 100 comprises an antenna multiplexer 116 and a second charge pump 118. The antenna multiplexer 116 is configured to couple the specific antenna selected by the selection unit to the second charge pump. In this way, the antenna that yields the highest output power (i.e., the highest amount of harvested energy) is selected as an input for the charge pump that will provide power to the other components of a device (not shown) in which the energy harvesting unit 100 is integrated or to which it supplies power. In other words, it becomes more likely that the energy harvesting unit 100 is able to power all the internal components of said device. Thus, an efficient energy harvesting unit 100 is provided. The skilled person will appreciate that, in a practical implementation, the energy harvesting unit 100 also contains matching circuits (not shown) close to the antennas 102, 104, 106. Contrary to, for example, the matching circuits of the embodiment shown in FIG. 3, these matching circuits are not connected to the multiplexer 116 and provide a fixed matching without a self-adjust function.

In one or more embodiments, the second charge pump is optimized for a higher output power than each of the first charge pumps. In other words, the first charge pumps may be so-called weak charge pumps, which are optimized for a relatively low output power, and consequently also for a relatively low input power, while the second charge pump is a so-called strong charge pump which is optimized for a relatively high output power. In this way, the RF signals received through the antennas may be processed (e.g., rectified) by the weak charge pumps at a relatively low power, while the highest possible amount of energy may be extracted from the selected antenna by the strong charge pump. This further facilitates providing an efficient energy harvesting unit, in the sense that the detection of the antenna that provides the highest output power may be performed using only a small amount of power. Furthermore, the detector itself (i.e., the selection unit) may be an ultra-low-power detector circuit, which further reduces the amount of power used for the detection task.

The skilled person will appreciate that a charge pump is characterized by a relationship between its output current (i.e., power) and its efficiency. This relationship can be displayed as a curve in a diagram, of which the x-axis represents the output current and the y-axis the efficiency. The peak of this curve is given by the design of the charge pump, and can be optimized for extreme low power (e.g., to power only the decision unit which selects the specific antenna) or for higher power as used for energy harvesting. The number of stages of the charge pump is one of the design criteria. Accordingly, a charge pump optimized for lower power may have more stages than a charge pump optimized for higher power. It is noted that other design criteria are the switching capacitor values or the switching frequency, which are typically fixed to the input frequency.

Furthermore, it is noted that for the first charge pumps, i.e. the weak charge pumps which have to extract the lowest power to power only the decision unit, it may not be possible to add switches between them and the antennas. More specifically, most of the CMOS processes only have devices which are switched off without having a gate voltage (i.e., the default state is off), and therefore these weak charge pumps also cannot be switched off during energy harvesting, which means that the power they extract from the field during the harvesting phase should be low. However, the second charge pump (i.e., the strong charge pump) can be connected to the antenna through switches, which will be part of the multiplexer. Therefore, the second charge pump may be switched off by default during the decision phase, and only connected to one antenna during the harvesting phase. It is noted that the term "decision phase" refers to a phase during which the specific antenna is selected by the selection unit.

In a practical implementation, the energy harvesting circuit further comprises a plurality of matching circuits, wherein each of said matching circuits is coupled between one of said pairs of antennas and first charge pumps. In one or more embodiments, the energy harvesting unit further comprises a tuning circuit configured to fine-tune the matching circuit which is coupled to the specific antenna selected by the selection unit. Accordingly, the fine-tuning may only be performed for the antenna which is coupled to the second charge pump (i.e., the strong charge pump). In particular, there is a tradeoff between bandwidth and the peak power which can be extracted. If the tuning circuit in combination with the antenna is broad band only a small quality factor can be achieved which results in a low input voltage. To increase the input voltage a high quality factor is necessary which results in a low bandwidth. In this case it is important to match the antenna to the correct input frequency; this process may be referred to as a fine-tuning process or as a self-adjust process.

In one or more embodiments, the energy harvesting unit further comprises an energy storage unit coupled to an output of the second charge pump. In this way, the harvested energy may easily be stored for subsequent use by the device in which the energy harvesting unit is integrated or to which it supplies power. In one or more embodiments, the energy storage unit comprises a capacitor. This results in a practical implementation of the energy storage unit. The skilled person will appreciate that a typical energy harvesting unit may contain additional components, such as one or more limiter circuits which are provided at the input of the charge pumps and/or at the output of the charge pumps to limit the voltages if the energy harvesting unit is close to a strong transmitter, as well as serial regulators or current sources between the output of the second charge pump and the energy storage unit in order to optimize the charging behavior. Furthermore, in a practical implementation, the first charge pumps are configured to rectify the signals received by said antennas. In this way, the strengths of the signals received through the different antennas may easily be measured and compared by the selection unit.

In one or more embodiments, the pairs of antennas and first charge pumps are tuned to different radio frequency bands. In this way, the available power may be monitored on different frequency bands, and the antenna tuned to the frequency band that has the highest available amount of power may be used for energy harvesting, in particular by coupling said antenna to the second charge pump. In a practical implementation, each of the matching circuits between the pairs of antennas and first charge pumps is tuned to a center frequency of one of said radio frequency bands. In this way, the tuning of the pairs of antennas and first charge pumps to the different radio frequency bands may be facilitated.

In one or more embodiments, the antennas remain connected to the first charge pumps both during a decision phase of the energy harvesting unit and during an energy harvesting phase of the energy harvesting unit, and the second charge pump is not connected to any one of said antennas during said decision phase. Thus, as explained above, the first charge pumps may not be connected to the antennas through switches, so that they are permanently connected to the antennas, while the second charge pump can be connected to the antenna through switches integrated in the multiplexer. This results in a practical implementation including a plurality of weak charge pumps and a strong charge pump that can be selectively coupled to the strongest antenna. As mentioned above, the term "decision phase" refers to a phase during which the specific antenna (i.e., the strongest antenna) is selected by the selection unit.

Figure 2:
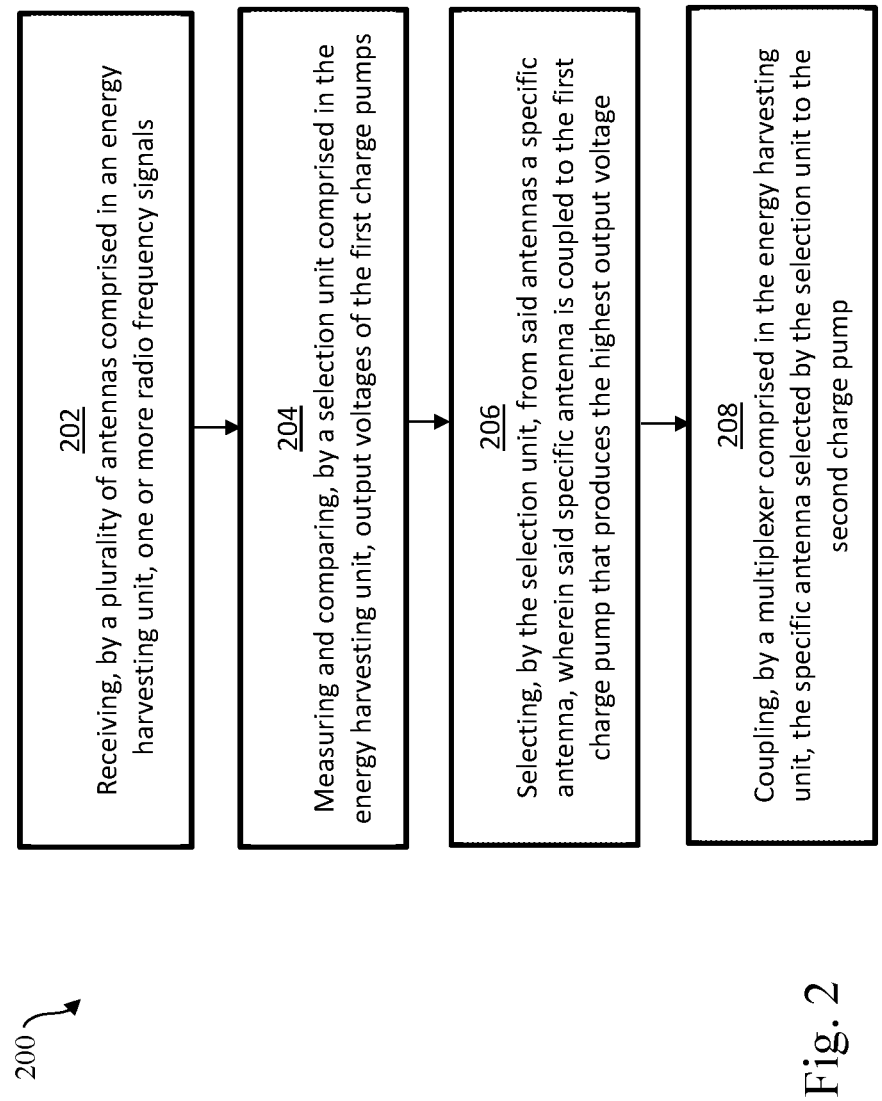
FIG. 2 shows an illustrative embodiment of a method of operating an energy harvesting unit.

FIG. 2 shows an illustrative embodiment of a method 200 of operating an energy harvesting unit. The method 200 comprises the following steps. At 202, a plurality of antennas comprised in an energy harvesting unit receives one or more signals. At 204, a selection unit comprised in the energy harvesting unit measures and compares output voltages of the first charge pumps. Furthermore, at 206, the selection unit selects, from said antennas, a specific antenna, wherein said specific antenna is coupled to the first charge pump that produces the highest output voltage. Furthermore, at 208, a multiplexer comprised in the energy harvesting unit couples the specific antenna selected by the selection unit to the second charge pump. As explained with reference to the corresponding energy harvesting unit shown in FIG. 1, the method 200 facilitates increasing the efficiency of the energy harvesting unit, in the sense that it becomes more likely that the energy harvesting unit is able to power all the internal components of the device in which it is integrated or to which it supplies power.

Figure 3:
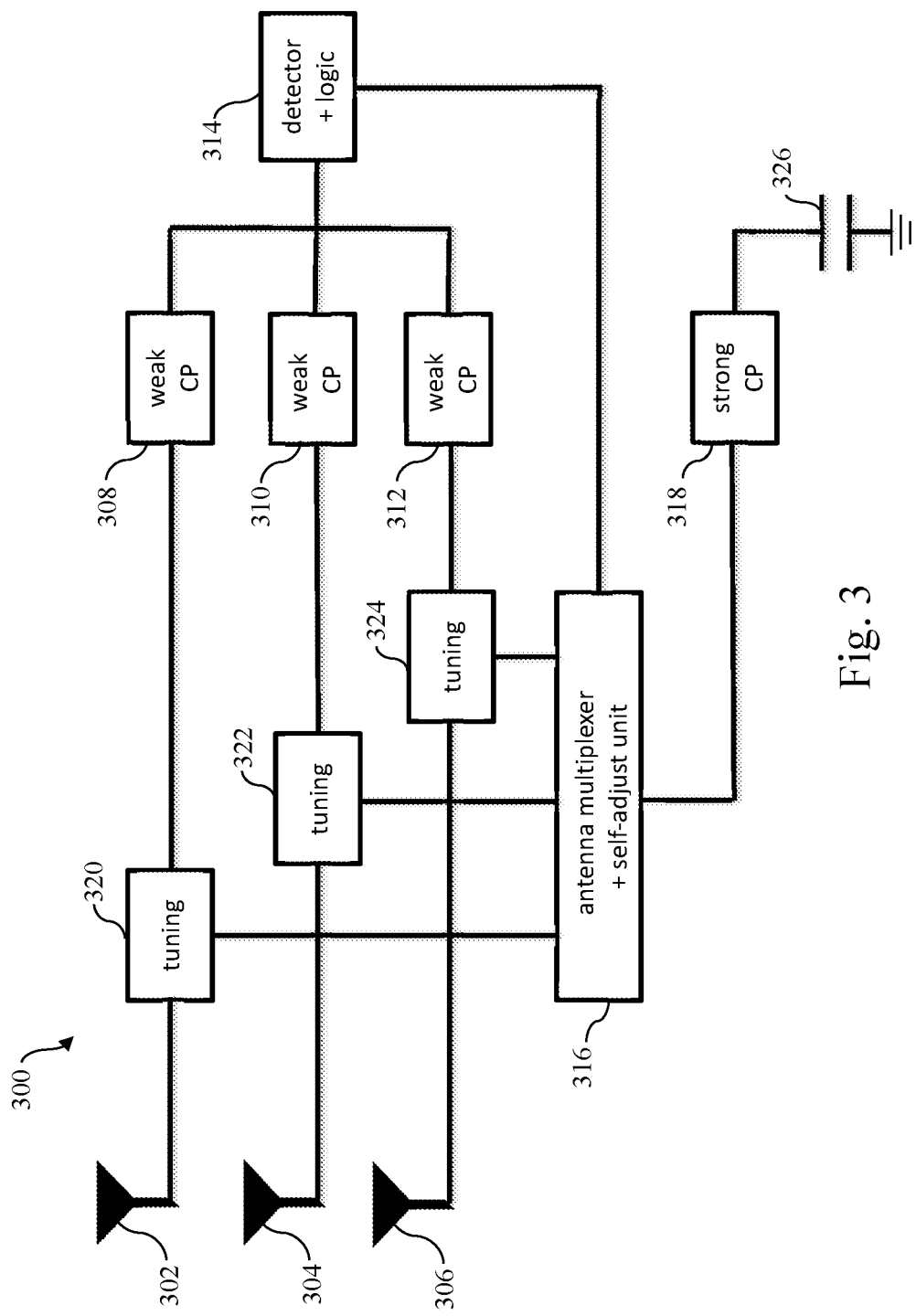
FIG. 3 shows another illustrative embodiment of an energy harvesting unit.

FIG. 3 shows another illustrative embodiment of an energy harvesting unit 300. The energy harvesting unit 300 comprises a plurality of antennas 302, 304, 306, which are configured to receive one or more radio signals. Furthermore, the energy harvesting unit 300 comprises a plurality of first charge pumps 308, 310, 312, more specifically weak charge pumps, each one of which is operatively coupled to one of said antennas 302, 304, 306, so that pairs of antennas and weak charge pumps are formed. In addition, the energy harvesting unit 300 comprises a detector and logic block 314. The detector and logic block 314, which also may be referred to as a selection unit, is configured to measure and compare output voltages of the weak charge pumps 308, 310, 312 and to select, from said antennas 302, 304, 306, a specific antenna, wherein said specific antenna is coupled to the weak charge pump that produces the highest output voltage. In the detector and logic block 314, the measurement of the output voltages may be performed by the detector part of the block, while the logic part of the block may perform the comparison of the output voltages and the selection of the specific antenna.

Furthermore, the energy harvesting unit 300 comprises an antenna multiplexer and self-adjust unit 316, as well as a second charge pump 318, more specifically a strong charge pump. The antenna multiplexer and self-adjust unit 316 is configured to couple the specific antenna selected by the selection unit to the strong charge pump 318. In this way, the antenna that yields the highest output power (i.e., the highest amount of harvested energy) is selected as an input for the strong charge pump 318, which will provide power to the other components of a device (not shown) in which the energy harvesting unit 300 is integrated or to which it supplies power. In other words, it becomes more likely that the energy harvesting unit 300 is able to power all the internal components of said device. Thus, an efficient energy harvesting unit 300 is provided.

Furthermore, the energy harvesting unit 300 comprises an energy storage unit, which is implemented as a capacitor 326. The capacitor 326 is coupled to the strong charge pump 318, from which it receives the harvested energy that should be stored. As mentioned above, a typical energy harvesting unit may contain additional components, such as limiters, serial regulators and current sources. Furthermore, self-adjust part of the antenna multiplexer and self-adjust unit 316 is configured to carry out tuning 320, 322, 324 of the matching circuit that is coupled between the selected antenna and the strong charge pump 318.

The energy harvesting unit 300 enables a continuous monitoring of the available power on different frequency bands. Then, depending on the measurement result, the frequency band with the highest available power is chosen and in a second step a finetuning of the matching on this frequency band may be performed. In particular, for each frequency band in which energy harvesting is considered there exists an antenna with a matching circuit that can be tuned to the center frequency of these bands. However, as mentioned above, the fine-tuning is only performed for the selected antenna. Furthermore, the rectification of the signals is performed using the weak charge pumps 308, 310, 312. It is noted that the term "weak" refers to the fact that the charge pump is optimized for a low output power, and consequently also for a low input power. It is noted that for a high input power the efficiency drops down and therefore also the retroaction to the antenna. Using weak charge pumps for the detection of the strongest signal thus increases the efficiency of the energy harvesting unit 300.

Furthermore, an ultra-low-power detector circuit may measure the output voltages of the weak charge pumps 308, 310, 312 and decide on which frequency band the maximum power is available. Then, the antenna multiplexer connects the strong charge pump 318 to the antenna with the highest available power. It is noted that a strong charge pump is optimized for a higher output power. In addition, it is possible to selectively connect this strong charge pump 318 to one of the antennas, while the weak charge pumps 308, 310, 312 remain connected to the respective antennas 302, 304, 306. Furthermore, a fine-tuning of the matching circuit of the chosen band in connection to the strong charge pump 318 may be performed. The capacitor 326 coupled to the output of the strong charge pump 318 stores the harvested energy, which can be used to supply a device, such as a sensor node. The skilled person will appreciate that there are different possibilities for the power management in the sensor node, which are for example based on an ultra-low-power timer or on a comparator that uses a threshold.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 energy harvesting unit
102 antenna
104 antenna
106 antenna
108 charge pump
110 charge pump
112 charge pump
114 detector
116 antenna multiplexer
118 charge pump
200 method of operating an energy harvesting unit
202 receiving, by a plurality of antennas comprised in an energy harvesting unit, one or more radio frequency signals
204 measuring and comparing, by a selection unit comprised in the energy harvesting unit, output voltages of the first charge pumps
206 selecting, by the selection unit, from said antennas a specific antenna, wherein said specific antenna is coupled to the first charge pump that produces the highest output voltage
208 coupling, by a multiplexer comprised in the energy harvesting unit, the specific antenna selected by the selection unit to the second charge pump
300 energy harvesting unit
302 antenna
304 antenna
306 antenna
308 weak charge pump
310 weak charge pump
312 weak charge pump
314 detector and logic
316 antenna multiplexer and self-adjust unit
318 strong charge pump
320 tuning
322 tuning
324 tuning
326 capacitor

The invention claimed is:

1. An energy harvesting unit, comprising:
a plurality of antennas configured to receive one or more signals;
a plurality of first charge pumps, wherein each of said first charge pumps is operatively coupled to one of said antennas, thereby forming pairs of antennas and first charge pumps;
a selection unit configured to measure and compare output voltages of the first charge pumps and to select, from said antennas, a specific antenna, wherein said specific antenna is coupled to the first charge pump that produces the highest output voltage;
a second charge pump;
a multiplexer, wherein said multiplexer is configured to couple the specific antenna selected by the selection unit to the second charge pump.

2. The energy harvesting unit of claim 1, wherein the second charge pump is optimized for a higher output power than each of the first charge pumps.

3. The energy harvesting unit of claim 1, further comprising a plurality of matching circuits, wherein each of said matching circuits is coupled between one of said pairs of antennas and first charge pumps.

4. The energy harvesting unit of claim 3, further comprising a tuning circuit configured to fine-tune the matching circuit which is coupled to the specific antenna selected by the selection unit.

5. The energy harvesting unit of claim 1, further comprising an energy storage unit coupled to an output of the second charge pump.

6. The energy harvesting unit of claim 5, wherein the energy storage unit comprises a capacitor.

7. The energy harvesting unit of claim 1, wherein the first charge pumps are configured to rectify the signals received by said antennas.

8. The energy harvesting unit of claim 1, wherein said pairs of antennas and first charge pumps are tuned to different radio frequency bands.

9. The energy harvesting unit of claim 8 further comprising a plurality of matching circuits, wherein each of said matching circuits is coupled between one of said pairs of antennas and first charge pumps, and wherein each of the matching circuits is tuned to a center frequency of one of said radio frequency bands.

10. The energy harvesting unit of claim 1, wherein:
the antennas remain connected to the first charge pumps both during a decision phase of the energy harvesting unit and during an energy harvesting phase of the energy harvesting unit;
the second charge pump is not connected to any one of said antennas during said decision phase.

11. A sensor node, in particular a sensor node included in an internet-of-things sensor network, comprising the energy harvesting unit of claim 1.

12. A method of operating an energy harvesting unit, the energy harvesting unit comprising a plurality of antennas, a plurality of first charge pumps, a selection unit, a second charge pump and a multiplexer, wherein each of said first charge pumps is operatively coupled to one of said antennas, thereby forming pairs of antennas and first charge pumps, the method comprising:

receiving, by the antennas, one or more signals;
measuring and comparing, by the selection unit, output voltages of the first charge pumps;
selecting, by the selection unit, from said antennas a specific antenna, wherein said specific antenna is coupled to the first charge pump that produces the highest output voltage;
coupling, by the multiplexer, the specific antenna selected by the selection unit to the second charge pump.

13. The method of claim 12, wherein the second charge pump is optimized for a higher output power than each of the first charge pumps.

14. The method of claim 12, wherein the energy harvesting unit further comprises a plurality of matching circuits, wherein each of said matching circuits is coupled between one of said pairs of antennas and first charge pumps.

15. The method of claim 12, further comprising storing the output of the second charge pump in an energy storage unit comprised in the energy harvesting unit.

16. The method of claim 15, wherein the energy storage unit comprises a capacitor.

17. The method of claim 12, wherein the first charge pumps rectify the signals received by said antennas.

18. The method of claim 12, wherein said pairs of antennas and first charge pumps are tuned to different radio frequency bands.

19. The method of claim 18, wherein the energy harvesting unit further comprises a plurality of matching circuits, wherein each of said matching circuits is coupled between one of said pairs of antennas and first charge pumps, and wherein each of the matching circuits is tuned to a center frequency of one of said radio frequency bands.

20. The method of claim 12, wherein:
the antennas remain connected to the first charge pumps both during a decision phase of the energy harvesting unit and during an energy harvesting phase of the energy harvesting unit;
the second charge pump is not connected to any one of said antennas during said decision phase.

* * * * *